(12) United States Patent
Hong et al.

(10) Patent No.: US 6,838,497 B2
(45) Date of Patent: Jan. 4, 2005

(54) FLAME RETARDANT THERMOPLASTIC RESIN COMPOSITION CONTAINING STYRENE POLYMER AS COMPATABILIZER AND OXAPHOSPHOLANE COMPOUND AS FLAME RETARDANT

(75) Inventors: Sang-Hyun Hong, Gyeonggi-do (KR); Bok-Nam Jang, Seoul (KR); Young-Kil Chang, Seoul (KR); Sung-Hee Ahn, Seoul (KR); Jae-Ho Yang, Gyeonggi-do (KR)

(73) Assignee: Cheil Industries Inc., Kyungbuk (KR)

( * ) Notice: Subject to any disclaimer, the term of this patent is extended or adjusted under 35 U.S.C. 154(b) by 19 days.

(21) Appl. No.: 10/230,965

(22) Filed: Aug. 29, 2002

(65) Prior Publication Data

US 2003/0130385 A1 Jul. 10, 2003

Related U.S. Application Data

(63) Continuation-in-part of application No. 10/052,205, filed on Jan. 16, 2002, now Pat. No. 6,716,900, and a continuation-in-part of application No. 10/011,056, filed on Dec. 6, 2001, now Pat. No. 6,646,032, and a continuation-in-part of application No. 09/580,907, filed on May 31, 2000, now Pat. No. 6,653,374, which is a continuation-in-part of application No. 09/473,607, filed on Dec. 29, 1999, now abandoned, and a continuation-in-part of application No. 09/473,553, filed on Dec. 29, 1999, now abandoned, which is a continuation of application No. 09/233,415, filed on Jan. 19, 1999, now abandoned, which is a continuation-in-part of application No. 10/231,448, filed on Aug. 29, 2002.
(60) Provisional application No. 60/378,527, filed on May 6, 2002.

(30) Foreign Application Priority Data

Sep. 2, 1998 (KR) ............................... 98-36004
Jul. 14, 1999 (KR) ............................... 99-28442
Jul. 14, 1999 (KR) ............................... 99-28443
Jul. 14, 1999 (KR) ............................... 99-28444

(51) Int. Cl.$^7$ ........................................ C08K 5/5373
(52) U.S. Cl. .................. 524/117; 524/127; 524/136; 524/141
(58) Field of Search .......................... 524/117, 136, 524/141

(56) References Cited

U.S. PATENT DOCUMENTS

| | | | |
|---|---|---|---|
| 4,022,826 A | | 5/1977 | Lohmar et al. .............. 562/817 |
| 4,081,463 A | | 3/1978 | Birum et al. ................. 562/24 |
| 4,113,669 A | * | 9/1978 | Zondler et al. ............. 521/108 |
| 4,503,178 A | | 3/1985 | Green ........................ 524/116 |
| 4,769,182 A | | 9/1988 | Hazen .......................... 562/24 |
| 5,334,760 A | | 8/1994 | Wachi et al. ............... 562/817 |

FOREIGN PATENT DOCUMENTS

| | | |
|---|---|---|
| JP | 7-48491 | 2/1995 |
| KR | 1999-28442 | 2/2001 |
| KR | 1999-28443 | 2/2001 |

OTHER PUBLICATIONS

Costa, L. et al. "Flame–retardant Properties of PhenolFormaldehyde–Type Resins and Triphenyl Phosphate in Styrene–Acrylonitrile Copolymers", Journal of Applied Polymer Science, vol. 68, p. 1067–1076 (1998).

Translation of claims of JP Application No. 7–48491 published Feb. 21, 1995.

Translation of claims of KR Application No. 1999–28442 published Feb. 5, 2001.

Translation of claims of KR Application No. 1999–28443 published Feb. 5, 2001.

* cited by examiner

*Primary Examiner*—Peter Szekely
(74) *Attorney, Agent, or Firm*—Maria Parrish Tungol

(57) ABSTRACT

The present invention relates to a flame retardant thermoplastic resin composition that comprises (A) about 40 to 95 parts by weight of a rubber modified styrene-containing resin, (B) about 5 to 60 parts by weight of polyphenylene ether resin, (C) about 2 to 30 parts by weight of a styrene-containing copolymer resin having about 5 to 18 % by weight of acrylonitrile in the copolymer per 100 parts by weight of the sum of (A) and (B), (D) about 0.5 to 20 parts by weight of an oxaphospholane compound per 100 parts by weight of the sum of (A) and (B), and (E) about 0 to 30 parts by weight of a phosphoric acid ester compound per 100 parts by weight of the sum of (A) and (B).

20 Claims, No Drawings

FLAME RETARDANT THERMOPLASTIC RESIN COMPOSITION CONTAINING STYRENE POLYMER AS COMPATABILIZER AND OXAPHOSPHOLANE COMPOUND AS FLAME RETARDANT

This application is a continuation-in-part of Ser. No. 10/052,205 filed on Jan. 16, 2002, now U.S. Pat. No. 6,716,900, which is a continuation-in-part of Ser. No. 09/473,607 filed on Dec. 29, 1999, now abandoned and Ser. No. 09/473,553 filed on Dec. 29, 1999, now abandoned and Ser. No. 09/580,907 filed May 31, 2000, now U.S. Pat. No. 6,653,374 and Ser. No. 10/011,056 filed on Dec. 6, 2001, now U.S. Pat. No. 6,646,032 which is a continuation of Ser. No. 09/233,415 filed Jan. 19, 1999, now abandoned.

This application is also a continuation-in-part of U.S. application Ser. No. 10/231,448 filed on Aug. 29, 2002 and also claims the benefit of 60/378,527 filed on May 6, 2002.

FIELD OF THE INVENTION

The present invention relates to a thermoplastic resin composition with good flame retardancy. More particularly, the present invention relates to a thermoplastic resin composition that comprises a blend of a rubber modified styrene-containing resin and a polyphenylene ether resin, an oxaphospholane compound and, optionally, a phosphoric acid ester compound as a flame retardant.

BACKGROUND OF THE INVENTION

Rubber modified styrene-containing resin has good processability, high impact strength, and good appearance. Accordingly, the resin has been widely applied in the manufacture of electrical appliances and office supplies. When rubber modified styrene-containing resin is used in personal computers, facsimiles, and the like which emit heat, flame-retardance is required of the resin due to combustibility.

A widely known method for the flame retardancy is the addition of halogen-containing compounds or antimony-containing compounds to a rubber modified styrene-containing resin to impart flame retardance. The methods for improvement of flame-retardant property by applying halogen- and antimony-containing compound have advantages such as easy acquisition of flame retardance and no degradation of the physical properties. However, it was observed that the halogen-containing compound results in the corrosion of the mold itself by the hydrogen halide gases released during the molding process. These potentially fatal toxic gases are liberated in case of fire. Since a polybromodiphenyl ether, mainly used for a halogen-containing flame retardant, can produce toxic gases such as dioxin or furan during combustion, flame retardants which are not prepared with halogen-containing compound have become main concerns in this field.

It is commonly known a method to apply phosphorus or nitrogen compounds as halogen-free flame retardant to a resin composition. However, use of only phosphorus compound reduces the heat resistance of a rubber modified styrene-containing resin and does not impart sufficient flame retardance. Generally, when a rubber modified styrene-containing resin such as ABS is burned, a char is not produced due to decomposition and vaporization in most parts (Journal of Applied Polymer Science, 1998, vol. 68, p. 1067). Therefore, to impart flame retardancy, it is necessary to add a char-forming agent to a resin composition.

Japanese Patent Laid-open No. 7-48491 discloses a flameproof thermoplastic resin, made by adding a novolac phenolic resin and a phosphoric acid ester into a thermoplastic copolymer resin composed of a rubber copolymer and an aromatic vinyl monomer. It was found that in order to obtain a good property of flame retardancy, a phenolic resin as a char-forming agent and a phosphoric acid ester compound as a flame retardant should be added in relatively large amounts. However, in this case, the heat resistance and the mechanical strength such as impact strength of the resin composition are reduced.

U.S. Pat. No. 4,526,917 discloses that TPP and a mono phosphoric acid ester compound having a mesityl group are added to a base resin comprised a polyphenylene ether resin and a styrenic resin. However, the amount of polyphenylene ether is increased to improve a flame retardancy, so a flowability of the resin composition is decreased.

U.S. Pat. No. 4,503,178 disclosed cyclic phosphine oxides that are useful as flame retardants for styrene modified polyphenylene ether resins. Cyclic phosphinyl-carboxylic acid derivatives are not disclosed.

U.S. Pat. No. 4,081,463 relates to the production of 2-carboxyethyl(phenyl)phosphinic acid which is useful as a flame retardant with organic polymers such as polyester.

U.S. Pat. No. 5,334,760 discloses that a ring-opened oxaphospholane can be used as a flame retardant for polyester. A phosphinyl-carboxylic acid derivative in the form of a cyclic acid anhydride is also disclosed. The flame retardants are disclosed as being useful for polyester.

German Patent Laid-Open No. 28 36 771 discloses that a cyclic phosphate can be used as a flame retardant. The cyclic phosphate does not contain any carboxylic acid portion.

The present inventors disclosed a flame retardant thermoplastic resin composition containing no phenolic resin in order to solve the previously discussed problems in Korean Patent Application Nos. 1999-028442 and 1999-028443, herein incorporated by reference. The resin compositions disclosed in these patent application comprise a blend of a rubber-modified styrene-containing resin and a polyphenylene ether resin as a base resin, a styrene-acrylonitrile (SAN) copolymer having from 5 to 18% by weight of acrylonitrile as a compatibilizer to improve heat resistance and flame retardance and a phosphoric acid ester compound as a flame-retardant to improve flame retardance property without decrease of mechanical properties.

Resin compositions containing an oxaphospholane compound as a non-halogen flame retardant in a base resin comprised of rubber modified polystyrene resin and polyphenylene ether are disclosed in commonly owned Ser. No. 10/231,448, herein incorporated by reference.

The thermoplastic resin compositions according to the present invention having highly improved flame retardance are obtained by adding an oxaphospholane compound alone or in combination with a phosphoric acid ester compound as a flame retardant to a blend of a rubber-modified styrene-containing resin, a polyphenylene ether resin, and a compatibilizer. The thermoplastic resin compositions according to the present invention have good mechanical properties, heat resistance, and flame retardance.

SUMMARY OF THE INVENTION

A flame retardant thermoplastic resin composition of the present invention comprises (A) about 40 to 95 parts by weight of a rubber modified styrene-containing resin composed of
(a1) about 20 to 100% by weight of a styrene-containing graft copolymer resin prepared by graft-polymerizing about 90 to 40% by weight of a monomer mixture consisting of about 50 to 82% by weight of styrene-containing monomer, about 19 to 50% by weight of unsaturated nitrile-containing monomer and about 0 to 40% by weight of monomer selected from the group consisting of acrylic acid, methacrylic acid, maleic anhydride and N-substituted maleimide onto about 10 to 60% by weight of a rubber, and (a2) about 80 to 0% by weight of a styrene-containing copolymer resin prepared by copolymerizing about 50 to 82% by weight of styrene-containing monomer, about 19 to 50% by weight of unsaturated nitrile-containing monomer and about 0 to 40% by weight of monomer selected from the group consisting of acrylic acid, methacrylic acid, maleic anhydride and N-substituted maleimide;

(B) about 5 to 60 parts by weight of polyphenylene ether resin;

(C) about 2 to 30 parts by weight of a styrene-containing copolymer resin having about 5 to 18% by weight of acrylonitrile in the copolymer per 100 parts by weight of the sum of (A) and (B); and (D) about 0.5 to 20 parts by weight of an oxaphospholane compound per 100 parts by weight of the sum of (A) and (B); and optionally, (E) about 0 to 30 parts by weight of a phosphoric acid ester compound per 100 parts by weight of the sum of (A) and (B).

DETAILED DESCRIPTION OF THE INVENTION

A flame retardant thermoplastic resin composition according to the present invention comprises (A) about 40 to 95 parts by weight of a rubber modified styrene-containing resin composed of
(a1) about 20 to 100% by weight of a styrene-containing graft copolymer resin prepared by graft-copolymerizing about 90 to 40% by weight of a monomer mixture comprised of
about 50 to 82% by weight of styrene-containing monomer,
about 19 to 50%, by weight of unsaturated nitrile-containing monomer and
about 0 to 40% by weight of monomer selected from the group consisting of acrylic acid,
methacrylic acid, maleic anhydride and N-substituted maleimide onto about 10 to 60% by weight of a rubber, and
(a2) about 80 to 0% by weight of a styrene-containing copolymer resin prepared by copolymerizing
about 50 to 82% by weight of styrene-containing monomer,
about 19 to 50% by weight of unsaturated nitrile-containing monomer and
about 0 to 40% by weight of a monomer selected from the group consisting of acrylic
acid, methacrylic acid, maleic anhydride and N-substituted maleimide;
(B) about 5 to 60 parts by weight of polyphenylene ether resin;
(C) about 2 to 30 parts by weight of a styrene-containing copolymer resin having about 5 to 18% by weight of acrylonitrile in the copolymer per 100 parts by weight of the sum of (A) and (B); and
(D) about 0.5 to 20 parts by weight of an oxaphospholane compound, per 100 parts by weight of the sum of (A) and (B); and optionally, (E) about 0 to 30 parts by weight of a phosphoric acid ester compound, per 100 parts by weight of the sum of (A) and (B).

A rubber modified styrene-containing resin means a styrene-containing graft copolymer resin such as ABS, that contains a styrene-containing copolymer resin such as SAN. In the rubber modified styrene-containing resin, rubber phase copolymers are dispersed in the form of particles in a matrix. The resin is prepared by mixing a styrene-containing monomer and an unsaturated nitrile monomer polymerizable therewith in the presence of a rubber phase polymer. Such rubber-modified styrene-containing resin is prepared by known methods such as emulsion polymerization, suspension polymerization or bulk polymerization, and is conventionally produced by an extrusion with a styrene-containing graft copolymer resin and a styrene-containing copolymer resin. In a bulk polymerization, both a styrene-containing graft copolymer resin and a styrene-containing copolymer resin are prepared together in one process. In other words, a one step process is employed to produce a rubber modified styrene-containing resin. In other polymerizations, a styrene-containing graft copolymer resin and a styrene-containing copolymer resin may be prepared separately.

The rubber modified styrene-containing resin (A) and a polyphenylene ether resin (B) are employed as a base resin, a styrene-containing copolymer resin having about 5 to 18% by weight of acrylonitrile in the copolymer is a compatabilizer of the base resin, and an oxaphospholane compound alone or in combination with an aromatic phosphoric acid ester compound is used as a flame retardant. Each component will be described in detail as follow:

(A) Rubber Modified Styrene-containing Resin

In the rubber modified styrene-containing resin prepared from aromatic vinyl copolymers, rubber phase copolymers are dispersed in the form of particles in a matrix. The resin is prepared by mixing an aromatic styrene-containing monomer and an unsaturated nitrile-containing monomer, which can be polymerized therewith, in the presence of a rubber phase polymer. Such rubber modified styrene-containing resins are known in the art and are prepared by a known method such as emulsion polymerization, suspension polymerization or bulk polymerization, and is conventionally produced by an extrusion with a graft copolymer resin and a copolymer resin. In a bulk polymerization, both a styrene-containing graft copolymer resin and a styrene-containing copolymer resin are not prepared separately but prepared together in one process, thereby to produce a rubber modified styrene-containing resin. In either case, the contents of rubber in a final rubber modified styrene-containing resin to the total weight of the base resin are preferably in the range of about 5 to 30% by weight.

Examples of such resins are acrylonitrile-butadiene-styrene (ABS) copolymer resin, acrylonitrile-acryl rubber-styrene (AAS) copolymer resin, acrylonitrile-ethylenepropylene rubber-styrene (AES) copolymer, and the like. In the rubber modified styrene-containing resin, a styrene-containing graft copolymer resin (a1) can be used alone or in combination with a styrene-containing copolymer resin (a2) in consideration of compatibility thereof.

In this invention, a rubber modified styrene-containing resin is prepared by mixing about 20 to 100%, preferably about 25–70%, by weight of a styrene-containing graft copolymer resin (a1) with about 0 to 80%, preferably about 30–75%, by weight of a styrene-containing copolymer resin (a2).

(a1) Styrene-containing Graft Copolymer Resin

Examples of rubber used for the styrene-containing graft copolymer resin are a diene-containing rubber such as polybutadiene, poly(styrene-butadiene) and poly(acrylonitrile-butadiene); a saturated rubber in which hydrogen is added to said diene-containing rubber; an isoprene rubber; a chloroprene rubber; a poly (butyl acrylate); and a terpolymer of ethylene-propylene-diene. It is preferable to use a diene-containing rubber, more preferably a butadiene-containing rubber.

Aromatic styrene-containing monomers for use in preparing the graft copolymer are styrene, α-methylstyrene, p-methylstyrene, and related styrenic monomers that are known in the art. Styrene is preferred.

At least one copolymerizable unsaturated nitrile-containing monomer is copolymerized with the aromatic styrene-containing monomers. As used herein, unsaturated nitrile-containing monomers means acrylonitrile or methacrylonitrile or mixtures thereof. The content of rubber is preferably in the range of about 10 to 60% by weight based on the total weight of a graft copolymer resin.

Except rubber component, it is preferable that the aromatic styrene-containing monomer component is about 50 to 82%, preferably about 65–80%, by weight, and the unsaturated nitrile-containing monomer component is about 19 to 50%, preferably about 20 to 35%, by weight.

In addition, in order to give good characteristics of processability and heat resistance, the monomers such as acrylic acid, methacryl acid, maleic anhydride and N-substituted maleimide can be added in the graft polymerization. The amounts of the monomers are in the range of 0 to 40% by weight based on the styrene-containing graft copolymer resin. To acquire good impact strength and appearance when said styrene-containing graft copolymer is prepared, the average size of rubber particles is preferred to be in the range of from 0.1 to 4 mm (a2) Styrene-containing Copolymer Resin The styrene-containing copolymer resin is prepared in accordance with the proportion and compatibility of the monomers excluding rubbers in the components of styrene-containing graft copolymer resin prepared as above.

The styrene-containing copolymer resin is prepared by introducing at least one unsaturated nitrile-containing monomer and the aromatic styrene-containing monomers.

The aromatic styrene-containing monomer are styrene, α-methylstyrene, p-methylstyrene, and related styrenic monomers that are known in the art. Styrene is the most preferable. The aromatic styrene-containing monomer in the total styrene-containing copolymer resin is contained in the amount of about 50 to 82% by weight.

At least one copolymerizable unsaturated nitrile-containing monomer is used with the aromatic styrene-containing monomer. The unsaturated nitrile-containing monomers used in the present invention are acrylonitrile or methacrylonitrile or a mixture thereof. It is preferable that about 19 to 50%, preferably about 20–35%, by weight of the unsaturated nitrile-containing monomer to the total copolymer is employed.

In addition, in order to improve characteristics of processability and heat resistance, about 0 to 40% by weight of a monomer such as acrylic acid, methacrylic acid, maleic anhydride and N-substituted maleimide may be added and copolymerized thereto.

The rubber modified styrene-containing resin described and used as component (A) in the compositions disclosed in copending Ser. No. 10 052 205, herein incorporated by reference, may also be used as component (A) in the compositions described herein.

The compositions according to the present invention contain about 40 to 95, preferably about 60 to 85, parts by weight of (A) a rubber modified styrene-containing resin composed of (a1) about 20 to 100%, preferably about 25 to 70%, by weight of a styrene-containing graft copolymer resin prepared by graft-polymerizing about 90 to 40% by weight of a monomer mixture comprised of about 50 to 82%, preferably about 65 to 80%, by weight of a styrene-containing monomer, about 19 to 50%, preferably about 20–35%, by weight of unsaturated nitrile-containing monomer and about 0 to 40% by weight of monomer selected from the group consisting of acrylic acid, methacrylic acid, maleic anhydride and N-substituted maleimide onto about 10 to 60% by weight of a rubber, and (a2) about 80 to 0%, preferably about 30–75%, by weight of a styrene-containing copolymer resin prepared by copolymerizing about 50 to 82% by weight of styrene-containing monomer, about 19 to 50%, preferably about 20–35%, weight of unsaturated nitrile-containing monomer and about 0 to 40% by weight of monomer selected from the group consisting of acrylic acid, methacrylic acid, maleic anhydride and N-substituted maleimide.

(B) Polyphenylene Ether Resin

Polyphenylene ether resin is employed as a base resin to improve flame retardancy, heat resistance and rigidity of the resin composition according to the present invention. Examples of the polyphenylene ether resin include poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly(2-ethyl-6-propyl-1,4-phenylene) ether, poly(2,6-diphenyl-1,4-phenylene) ether, copolymer of poly(2,6-dimethyl-1,4-phenylene) ether and poly(2,3,6-trimethyl-1,4-phenylene) ether, and copolymer of poly(2,6-dimethyl-1,4-phenylene) ether and poly(2,3,5-triethyl-1,4-phenylene) ether can be used. Preferably, copolymer of poly(2,6-dimethyl-1,4-phenylene) ether and poly(2,3,6-trimethyl-1,4-phenylene) ether, and poly(2,6-dimethyl-1,4-phenylene) ether. Poly(2,6-dimethyl-1,4-phenylene) ether is preferably used.

The degree of polymerization of polyphenylene ether is not specifically limited, but considering heat-stability or processability of the resin composition, it is preferable that the viscosity of polypheylene ether is in the range of 0.2 to 0.8 measured in chloroform solvent at 25° C.

The compositions according to this embodiment of the present invention contain (B) about 5 to 60 parts, preferably about 15 to 40 parts, by weight of polyphenylene ether resin. The polyphenylene ether resin disclosed as component (B) in Ser. No. 10 052 205, herein incorporated by reference, may be used as component (B) in the compositions according to this embodiment of the invention.

(C) Styrene-containing Copolymer Resin Having from 5 to 18% by Weight of Acrylonitrile The styrene-containing copolymer resin (C) is added to the base resin to improve compatibility between the rubber modified styrene-containing resin (A) and the polyphenylene ether resin (B).

The styrene-containing copolymer employed in this invention is comprised of about 82 to 95% by weight of styrene and about 5 to 18%, preferably about 10 to 18%, by weight of acrylonitrile. The method for polymerization of the styrene-containing copolymer resin above may optionally be selected from emulsion polymerization, suspension polymerization, and bulk polymerization in accordance with conventional techniques. It is preferable that the weight average molecular weight of the copolymer is in the range of from 50,000 to 200,000. Other monomers may be employed for copolymerization with styrene-acrylonitrile. The examples of the other monomers are metacrylate or phenyl maleimide, etc. To advance heat resistance, a substituted styrene may be used instead of styrene. The styrene-acrylonitrile copolymer is added to improve compatibility between the ABS resin (A) and the polyphenylene ether resin (B).

The amount of a styrene-acrylonitrile resin used as compatibilizer is about 2 to 30, preferably about 5 to 20 parts, by weight per 100 parts by weight of the base resin the sum of (A) and (B). If the copolymer (C) is not added, the resin composition shows reduction in mechanical properties due to low compatibility.

The compositions according to the present invention contain (C) about 2 to 30 parts, preferably about 5 to 20 parts, by weight of a styrene-containing copolymer resin having about 5 to 18%, preferably about 10 to 18%, by weight of acrylonitrile in the copolymer per 100 parts by weight of the sum of (A) and (B).

The compatabilizer disclosed as component (C) in Ser. No. 10 052 205, herein incorporated by reference, may be used as component (C) in the compositions according to the present invention.

(D) Oxaphospholane Compound

The oxaphospholane compound is represented by the following formula:

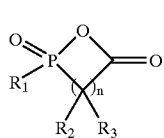

Formula (I)

where $R_1$ is hydrogen, $C_{1-6}$ alkyl, or $C_{6-15}$ aryl, $R_2$ and $R_3$ are hydrogen or $C_{1-6}$ alkyl, and n is in the range of 1 to 3.

The oxaphospholane compounds are known in the art and can be produced by known methods such as the method disclosed in U.S. Pat. No. 5,334,760, herein incorporated by reference. The preferable examples of the oxaphospholane compound are 2-methyl-2, 5-dioxo-1-oxa-2-phospholane and 2-phenyl-2, 5-dioxo-1-oxa-2-phospholane.

The compositions according to this embodiment of the present invention contain about 0.5 to 20 parts by weight of an oxaphospholane compound per 100 parts by weight of the sum of (A) and (B), preferably about 3 to 15 parts by weight based on 100 parts by weight of the sum of (A) and (B). In this embodiment of the present invention, the oxaphospholane compound can be employed alone or in combination with a phosphoric acid ester compound as a flame retardant.

(E) Phosphoric Acid Ester Compound

The phosphoric acid ester compound used in combination with the oxaphospholane compound in the present invention is represented by the following structural formula (II):

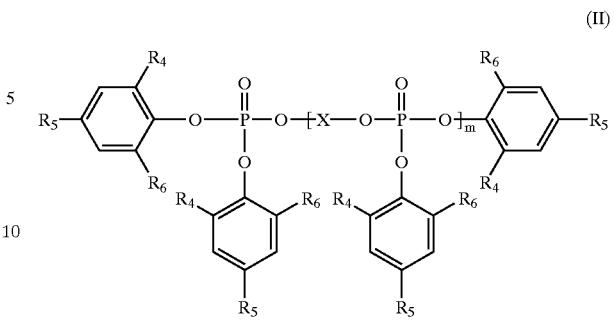

(II)

where $R_4$, $R_5$ and $R_6$ are hydrogen or alkyl of $C_{1-4}$, X is resorcinol, hydroquinol, bisphenol-A or bisphenol-S or an alkyl-substituted derivative of resorcinol, hydroquinol, bisphenol-A or bisphenol-S, and m is in the range of 0 to 4.

If m is 0 in Formula (II), the compounds may be triphenyl phosphate, tricresyl phosphate, trixylenyl phosphate, tri(2, 6-dimethylphenyl) phosphate, tri(2,4,6-trimethylphenyl) phosphate, tri(2,4-ditertiarybutylphenyl) phosphate, tri(2,6-ditertiarybutylphenyl) phosphate and the like, and if m is 1, the compounds may be resorcinolbis(diphenyl) phosphate, resorcinolbis(2,6-dimethylphenyl) phosphate, resorcinolbis (2,4-ditertiary butylphenyl) phosphate, hydroquinol(2,6-dimethylphenyl) phosphate, hydroquinol(2,4-ditertiarybutylphenyl) phosphate and the like. The phosphorous compounds are used in single or in combination.

The compositions according to the present invention contain about 0 to 30 parts by weight of the above phosphoric acid ester compound(s) per 100 parts by weight of the sum of (A) and (B), preferably about 0 to 10 parts by weight per 100 parts by weight of the sum of (A) and (B).

If necessary, a resin such as polyamide, polycarbonate, polystyrene and rubber reinforced polystyrene may be added optionally to the resin composition of this invention in the amount of from about 0 to 50 parts by weight per 100 parts by weight of the base resin (A) and (B). Other additives may be used in the thermoplastic resin composition of the present invention. The additives include an anti-dripping agent, an impact modifier, an inorganic filler such as asbestos, glass fiber, talc, ceramic and sulfate, a heat stabilizer, an oxidation inhibitor, a light stabilizer, pigment and/or dye. The additives are employed in about 0 to 50 parts by weight as per 100 parts by weight of the base resin.

The following examples are intended for the purpose of illustration and are not to be construed as in any way limiting the scope of the present invention. In the following examples, all parts and percentage are by weight unless otherwise indicated.

EXAMPLES

The components of (A) rubber modified styrene-containing resin, (B) polyphenylene ether resin, (C) styrene-acrylonitrile copolymer resin having 5 to 18% by weight of acrylonitrile, (D) oxaphospholane compound, and (E) phosphoric acid ester compound in Examples 1–3 and Comparative Example 1 is as follows:

(A) Rubber Modified Styrene-containing Resin (ABS Resin)
(a1) Styrene-containing Graft Copolymer Resin (ABS Resin)
50 parts of butadiene rubber latex powder, 36 parts of styrene, 14 parts of acrylonitrile and 150 parts of deionized water were blended. To the blend, 1.0 parts of potassium oleate, 0.4 parts of cumenhydroperoxide, 0.2 parts of mercaptan-containing chain transfer agent, 0.4 parts of glucose, 0.01 parts of ferrous sulfate hydrate, and 0.3 parts of sodium pyrophosphate were added. The blend was kept at 75° C. for 5 hours to obtain ABS latex. To the ABS latex, 0.4 parts of sulfuric acid was added and coagulated to obtain styrene-containing graft copolymer resin (g-ABS) in a powder form.

(a2) Styrene-containing Copolymer Resin With 25% by Weight of AN 75 parts of styrene, 25 parts of acrylonitrile, 120 parts of deionized water and 0.15 parts of azobisisobutylonitrile were blended. To the blend, 0.4 parts of tricalciumphosphate and 0.2 parts of mercaptan-containing chain transfer agent were added. The resultant solution was heated to 80° C. for 90 minutes and kept for 180 minutes. The resultant was washed, dehydrated and dried to produce SAN powder.

(B) Polyphenylene Ether Resin Poly(2,6-dimethyl-1,4-phenyl) ether by Asahi Co. of Japan (Product name: P-402) was used. The particles had the average size of several tens of microns ($\mu$m).

(C) Styrene-containing Copolymer Resin With 13% by Weight of AN 87 parts of styrene, 13 parts of acrylonitrile, 120 parts of deionized water, 0.1 parts of azobisisobutylonitrile, 0.2 parts of 1,1'-di(tertiarybutylperoxy)-3,3',5-trimethylcyclohexane, 0.4 parts of tricalciumphosphate and 0.2 parts of mercaptan-containing chain transfer agent were blended. The blended solution was heated up to 80° C. for 90 minutes and was kept it for 150 minutes. The solution was heated up to 95° C. again and kept for 120 minutes. The resultant was washed, dehydrated and dried.

(D) Oxaphospholane Compound 2-methyl-2, 5-dioxo-1-oxa-2-phospholane with a melting point of 242~245° C. was used.

(E) Phosphoric Acid Ester Compound

Triphenylphosphate (TPP) with a melting point of 48° C. was used.

The compositions of the components are shown in Table 1. The resin compositions were extruded at 250~280° C. with a conventional twin screw extruder in pellets. The resin pellets were dried at 80° C. for 3 hours and extruded into test specimens in a 6 oz. extruder at molding temperature of 220~280° C. and barrel temperature of 40~80° C., and the resin pellets were molded into test specimens. The flame retardancy was measured in accordance with UL94VB.

TABLE 1

| | | Examples | | | Comp. Example |
|---|---|---|---|---|---|
| | | 1 | 2 | 3 | 1 |
| (A) | (a1) | 40 | 40 | 40 | 40 |
| | (a2) | 25 | 25 | 25 | 25 |
| (B) | | 35 | 35 | 35 | 35 |
| (C) | | 11 | 11 | 11 | 11 |
| (D) | | 1 | 2 | 17 | 0 |
| (E) | | 17 | 17 | 0 | 17 |
| UL94VB (1/12") | | V-0 | V-0 | V-0 | V-1 |

As shown in Table 1, oxaphospholane alone or in combination with triphenylphsphate was used as a flame retardant in Examples 1 to 3, and triphenylphsphate only was used in Comparative Example 1. The resin compositions of Examples 1 to 3 have better flame retardancy than that of Comparative Example 1. When oxaphospholane was used, flame retardancy of the resin composition can be improved by increase of char formability.

What is claimed is:

1. A flame retardant thermoplastic resin composition comprising:
    (A) about 40 to 95 parts by weight of a rubber modified styrene-containing resin composed of
        (a1) about 20 to 100% by weight of a styrene-containing graft copolymer resin prepared by graft-polymerizing about 90 to 40% by weight of a monomer mixture comprised of
            about 50 to 82% by weight of styrene-containing monomer,
            about 19 to 50% by weight of unsaturated nitrile-containing monomer and
            about 0 to 40% by weight of monomer selected from the group consisting of acrylic acid, methacrylic acid, maleic anhydride and N-substituted maleimide onto about 10 to 60% by weight of a rubber, and
        (a2) about 80 to 0% by weight of a styrene-containing copolymer resin prepared by copolymerizing about 50 to 82% by weight of styrene-containing monomer, about 19 to 50% by weight of unsaturated nitrile-containing monomer and about 0 to 40% by weight of monomer selected from the group consisting of acrylic acid, methacrylic acid, maleic anhydride and N-substituted maleimide;
    (B) about 5 to 60 parts by weight of polyphenylene ether resin;
    (C) about 2 to 30 parts by weight of a styrene-containing copolymer resin having about 5 to 18% by weight of acrylonitrile in the copolymer per 100 parts by weight of the sum of (A) and (B); (D) about 0.5 to 20 parts by weight of an oxaphospholane compound per 100 parts by weight of the sum of (A) and (B); and
    (E) about 0 to 30 parts by weight of a phosphoric acid ester compound per 100 parts by weight of the sum of (A) and (B) wherein the oxaphospholane compound (D) is represented by the following formula:

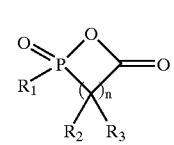

(I)

where $R_1$ is hydrogen, alkyl of $C_{1-6}$, or aryl of $C_{6-15}$, $R_2$ and $R_3$ are hydrogen or alkyl of $C_{1-6}$, and n is in the range of 1 to 3.

2. The flame retardant thermoplastic resin composition according to claim 1, wherein the styrene-containing monomer is styrene, $\alpha$-methylstyrene or p-methylstyrene.

3. The flame retardant thermoplastic resin composition according to claim 1, wherein the unsaturated nitrile-containing monomer is acrylonitrile.

4. The flame retardant thermoplastic resin composition according to claim 1, wherein the polyphenylene ether resin (B) is poly(2,6-dimethyl-1,4-phenylene) ether.

5. The flame retardant thermoplastic resin composition according to claim 1, wherein the oxaphospholane compound (D) is 2-methyl-2,5-dioxo-1-oxa-2-phospholane or 2-phenyl-2,5-dioxo-1-oxa-2-phospholane.

6. The flame retardant thermoplastic resin composition as defined in claim 1, wherein said phosphoric acid ester compound (E) is represented by the following formula:

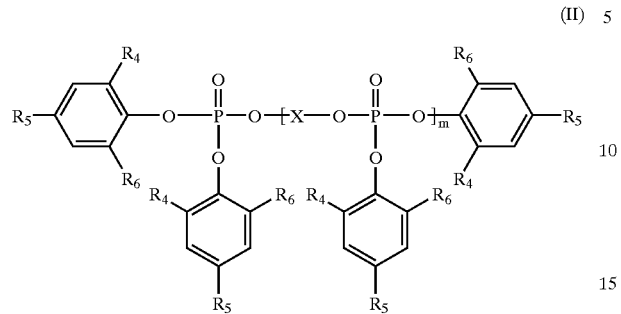

(II)

where $R_4$, $R_5$ and $R_6$ are hydrogen or alkyl of $C_{1-4}$, X is resorcinol, hydroquinol, bisphenol-A or bisphenol-S aryl or an alkyl-substituted derivative of resorcinol, hydroquinol, bisphenol-A or bisphenol-S, and m is in the range of 0 to 4.

7. The flame retardant thermoplastic resin composition as defined in claim 6, wherein said phosphoric acid ester compound (E) is a mixture of at least two aromatic phosphoric acid ester compounds having different m.

8. The flame retardant thermoplastic resin composition as defined in claim 1, wherein said resin composition further comprises up to 50 parts by weight of a resin selected from the group consisting of polyamide, polycarbonate, polystyrene, rubber-reinforced polystyrene and a mixture thereof per 100 parts by weight of the base resin (A) and (B).

9. The flame retardant thermoplastic resin composition as defined in claim 1, wherein said resin composition further comprises up to 50 parts by weight of an anti-dripping agent, an impact modifier, an inorganic filler, a heat stabilizer, an oxidation inhibitor, a light stabilizer, pigment and/or dye per 100 parts by weight of the base resin (A) and (B).

10. A molded article prepared with the flame retardant thermoplastic resin composition of claim 1.

11. A molded article prepared with the flame retardant thermoplastic resin composition of claim 2.

12. A molded article prepared with the flame retardant thermoplastic resin composition of claim 5.

13. A flame retardant thermoplastic resin composition comprising: about 60 to 85, parts by weight of (A) a rubber modified styrene-containing resin composed of
   (a1) about 25 to 70%, by weight of a styrene-containing graft copolymer resin prepared by graft-polymerizing about 90 to 40% by weight of a monomer mixture comprised of
   about 65 to 80%, by weight of a styrene-containing monomer,
   about 20 to 35%, by weight of unsaturated nitrile-containing monomer and
   about 0 to 40% by weight of monomer selected from the group consisting of acrylic acid, methacrylic acid, maleic anhydride and N-substituted maleimide onto about 10 to 60% by weight of a rubber, and
   (a2) about 30 to 75%, by weight of a styrene-containing copolymer resin prepared by copolymerizing
   about 50 to 82% by weight of styrene-containing monomer,
   about 20 to 35%, weight of unsaturated nitrile-containing monomer and
   about 0 to 40% by weight of monomer selected from the group consisting of acrylic acid, methacrylic acid, maleic anhydride and N-substituted maleimide.
(B) about 5 to 60 parts by weight of polyphenylene ether resin;
(C) about 2 to 30 parts by weight of a styrene-containing copolymer resin having about 5 to 18% by weight of acrylonitrile in the copolymer per 100 parts by weight of the sum of (A) and (B); (D) about 0.5 to 20 parts by weight of an oxaphospholane compound per 100 parts by weight of the sum of (A) and (B); and (E) about 0 to 30 parts by weight of a phosphoric acid ester compound per 100 parts by weight of the sum of (A) and (B) wherein the oxaphospholane compound (D) is represented by the following formula:

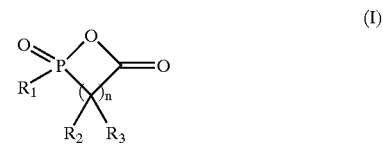

(I)

where $R_1$ is hydrogen, alkyl of $C_{1-6}$, or aryl of $C_{6-15}$, $R_2$ and $R_3$ are hydrogen or alkyl of $C_{1-6}$, and n is in the range of 1 to 3.

14. The flame retardant thermoplastic resin composition according to claim 13, wherein the styrene-containing monomer is styrene, α-methylstyrene or p-methylstyrene.

15. The flame retardant thermoplastic resin composition according to claim 13, wherein the unsaturated nitrile-containing monomer is acrylonitrile.

16. The flame retardant thermoplastic resin composition according to claim 13, wherein the polyphenylene ether resin (B) is poly(2,6-dimethyl-1,4-phenylene) ether.

17. The flame retardant thermoplastic resin composition according to claim 13, wherein the oxaphospholane compound (D) is 2-methyl-2,5-dioxo-1-oxa-2-phospholane or 2-phenyl-2,5-dioxo-1-oxa-2-phospholane.

18. A molded article prepared with the flame retardant thermoplastic resin composition of claim 13.

19. A molded article prepared with the flame retardant thermoplastic resin composition of claim 14.

20. A molded article prepared with the flame retardant thermoplastic resin composition of claim 17.

* * * * *